Dec. 9, 1924.
J. M. LANSDEN
1,518,937
MOTOR VEHICLE AND AXLE THEREFOR
Filed Dec. 2, 1918
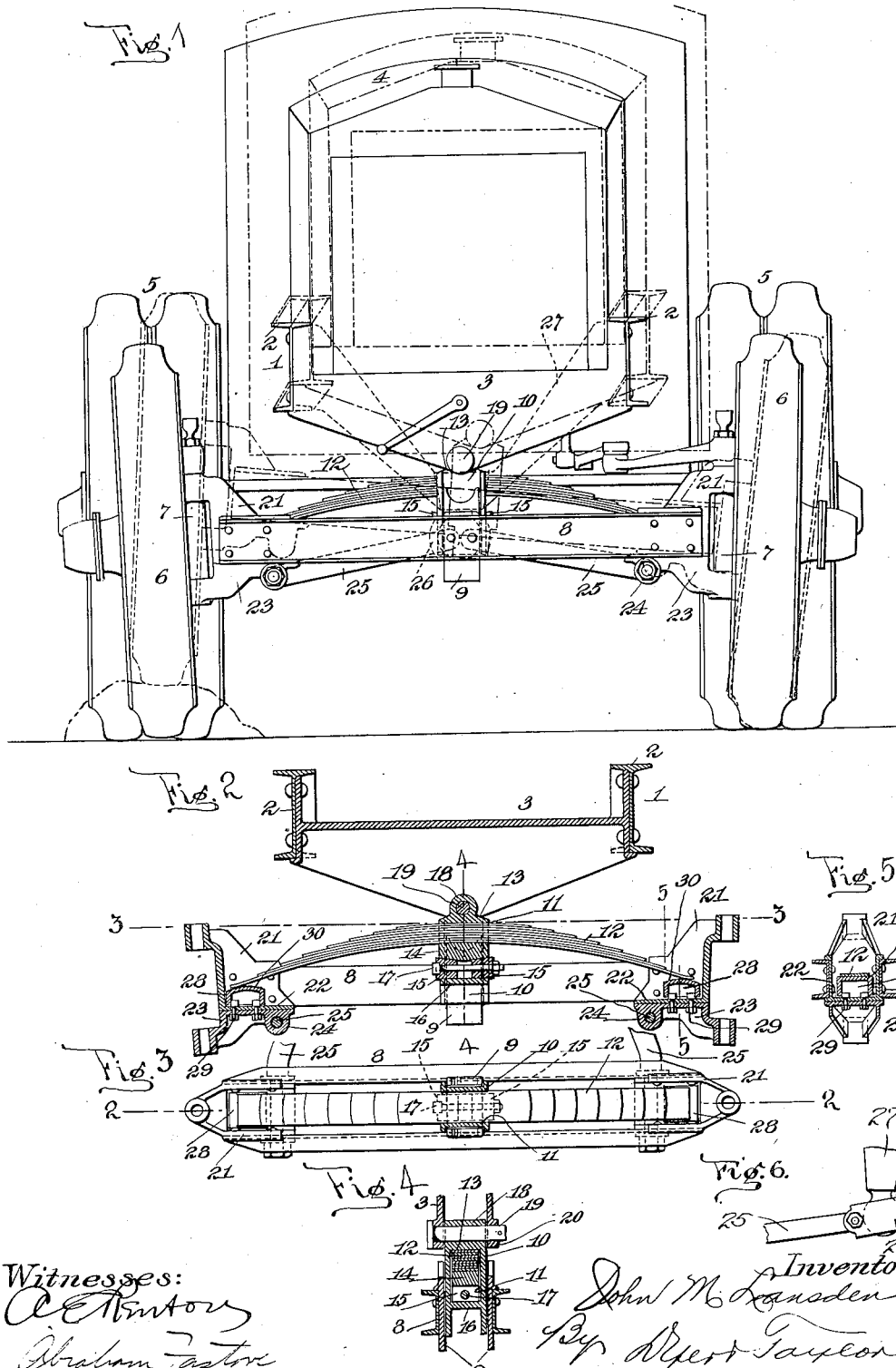

Patented Dec. 9, 1924.

1,518,937

UNITED STATES PATENT OFFICE.

JOHN M. LANSDEN, OF NEW YORK, N. Y.

MOTOR VEHICLE AND AXLE THEREFOR.

Application filed December 2, 1918. Serial No. 264,889.

*To all whom it may concern:*

Be it known that I, JOHN M. LANSDEN, a citizen of the United States, and a resident of the borough of Manhattan, city, county, and State of New York, have invented a certain new and useful Motor Vehicle and Axle Therefor, of which the following is a specification.

My invention relates to motor vehicles of the type wherein a more or less constant load is carried by one end of the chassis frame and in proximity to the front or steering wheels, and a variable load is carried by the opposite end of the frame and in proximity to the driving wheels.

One object of my invention is to provide means whereby great flexibility of the structure will be obtained and whereby shocks and strains will be evenly distributed throughout the frame.

A further object is to so construct and arrange the axle of the steering wheels that the same may move relatively to the frame in all directions without distorting the frame.

A still further object is to produce a device in which the weight only of the load is taken on the spring or springs whereby a much lighter spring may be employed, thereby preventing undue wear and tear on the wheels, tires and frame.

A still further object is to provide an axle which is simple in construction, light in weight, which may be easily removed from the frame, wherein broken or worn parts may be readily repaired or replaced and which will have great freedom of movement relatively to the frame.

These and further objects will more fully appear in the following specification and accompanying drawings considered together or separately.

In the accompanying drawings I have illustrated one embodiment of my invention in which like parts in all of the several figures are designated by similar characters of reference, and in which—

Fig. 1 is a front elevation of a motor vehicle embodying my invention.
Fig. 2 is a transverse sectional view of the same, the section being taken on the line 2—2 of Fig. 3.

Fig. 3 is a horizontal section on the line 3—3 of Fig. 2.

Fig. 4 is a section on the line 4—4 of Fig. 2.

Fig. 5 is a section on the line 5—5 of Fig. 2, and

Fig. 6 is a detail view of one of the axle pivots.

The invention is shown as applied to a truck but it will be understood that it may be applied to other types of vehicles as well.

In the drawings 1 designates a frame which comprises longitudinal members 2 and transverse members 3 and carries the usual motor, drive shaft, transmission and differential. The motor hood 4 is shown. The frame is supported on rear wheels 5 and front or steering wheels 6, the latter being carried by the usual knuckles 7 by means of which they may be moved in steering independently of the axle.

The axle is pivotally attached to the frame by means of a sliding connection whereby it may move toward and away from the frame, is capable of a rocking motion perpendicular to the plane of the longitudinal axis of the frame, while at the same time it is rigidly held against movement in the plane of the longitudinal center of the frame.

The axle comprises two channel beams 8 in parallel spaced relation, and secured to the center of the axle and between the beams 8 is a pair of guide plates 9, and a keeper 10 is slidably carried between the guides. The keeper is provided with flanges which engage the guides 9 and limit the travel of the keeper to movements vertically in the guide and perpendicular to the longitudinal axes of the axle and frame 1.

The keeper 10 is provided with an opening 11 therethrough. A semi-elliptic spring 12 is received in the opening and bears against the bottom of the upper member 13 of the keeper. A follower 14 having a convex upper face is placed within the opening with the convex face in engagement with long leaf of the spring 12. The lower face of the follower is inclined both ways from the center and a pair of oppositely inclined wedge blocks 15 are placed in position between the follower and a shelf 16 in the keeper 10. A bolt 17 having its head engaging a socket in one of the blocks 15 extends through both blocks and its outer extremity carries a nut. When the nut is set up the blocks 15 are drawn toward each other and force the follower into intimate contact with the spring 12 and the latter into intimate contact with the bottom of the member 13. The keeper 10 carries a bearing 18 and a bolt 19 passing through ears 20 on the front transverse member of the frame, and the bearing 18 retains the keeper in position in the frame.

At each end of the axle the beams 8 are secured together by means of a bracket 21 which carries a bearing for one end of the knuckle 7 of one steering wheel 6. The bracket 21 extends down between the axle beams and has a bottom plate 22 to which is bolted a bracket member 23 which carries the lower bearing for the steering knuckle. Each bracket member 23 has a depending lug 24 to which is secured the forward end of a stay member comprising two rods 25, 25. Said rods converge to the longitudinal center line of the frame at a point to the rear of the axle and approximately on a level with the longitudinal centers of the wheels 6.

The rods 25 are, at their convergent point, secured to one member of a universal joint 26 the other member of which is carried in a transverse frame member 27 which is secured to the members 2 and is of V-shape to bring the joint 26 to its proper level and to permit of the passage of the driving shaft.

The rods 25, joint 26 and member 27 form the only means for transmitting motion from the frame 1 to the axle and all strains and stresses, except vertical movements, to which the wheels 6 and axle are subjected are transmitted to the longitudinal center line of the frame through the triangular structure formed of the rods 25 and joint 26 and the member 27. The engagement of the rods 25 with the frame through the universal joint 26 will permit of great freedom of movement of the axle and, because of the three point connection between the axle and frame a shock caused by a road obstruction to the wheel carried at one end of the axle will be equally distributed to both of the frame members 2 by reason of the connection of the rods with the frame at the longitudinal center thereof.

Resting on the bottom 22 of each bracket 21 is a box-like bearing member 28 the sides of which are engaged by heads of the bolts 29 by which the bracket member 23 is secured to the bracket 21. The upper end 30 of bearing member 28 is convex the curvature extending longitudinally of the axle.

The spring 12 extends longitudinally of the axle and each end of the long leaf thereof rests upon the concave top of a bearing member 28. The ends of the spring are not secured to the bearing members 28 but engage the same by gravity alone, so that none of the driving stresses of the axle are transmitted to the frame through the spring.

In running on a smooth road the load being balanced the stress exerted by the traction of adhesive will be transmitted equally by both wheels to the axle and, by means of the rods 25 and transverse member 27, to the center line of the frame and be equally distributed over the entire frame.

Should one wheel encounter an obstruction as shown in dotted lines in Fig. 1, the force of impact will be taken by that wheel and the tendency will be to move that end of the axle backward and the opposite end forward. This will be resisted by the triangular structure comprising the rods 25 and a beam 8, and the axle will be firmly held at right angles to the frame.

As the wheel rides up on the obstruction the axle will pivot on the bolt 19 with the point of contact of the other front wheel with the road as a fulcrum, and the stay member 25 will pivot, but to a lesser extent at the joint 26. The front end of the frame will be raised but, because of its pivotal connection with the axle, it will not change its momentary plane and the weight of the frame and load will remain at approximately the center of the axle and be supported equally by both ends of the spring and both wheels.

The free riding or deflections of the frame are permitted by reason of the fact that the frame is pivotally connected to the rear axle and the connection between the said rear axle and frame through the springs is by gravity, and objectionable wearing, winding, and distortions of the main vehicle frame are eliminated and the plane of the frame will remain constant.

The axle comprises the beams 8, the spring 12, the guides 9, the stay member 25 and the keeper 10, and by removing the pivot member 19 the universal joint 26, the axle may be disconnected from the frame. The spring may be separated from the beams 8 by withdrawing the keeper from between the guides and the spring may be removed from the keeper by removing the bolt 17.

The spring is not secured to beams 8 but rests between them and is retained in place by gravity alone. This construction is made possible because of the fact that none of the driving strains or stresses are transmitted through the spring.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention what I claim and desire to secure by Letters Patent is as follows:—

1. A vehicle having a frame comprising longitudinal and transverse members, an axle adjacent one end of the frame, a spring carried by but unsecured to the axle, said spring being pivoted to the frame in the longitudinal center line of the frame, and a pivotal connection other than the spring between the axle and the frame.

2. A vehicle having a frame comprising longitudinal and transverse members, an axle adjacent one end of the frame, a spring carried by but unsecured to the axle, said spring being pivoted to the frame in the longitudinal center line of the frame, a pivotal connection other than the spring between the axle and the frame, and a triangular element secured to the axle near the extremities thereof and to the frame in the longitudinal center line thereof at a point removed from the spring pivot.

3. A vehicle having a frame comprising longitudinal and transverse members, an axle adjacent one end of the frame, a spring carried by but unsecured to the axle, said spring being pivoted to the frame in the longitudinal center line of the frame, a pivotal connection other than the spring between the axle and the frame, and a triangular element secured by a universal joint to the axle near the extremities thereof and to the frame in the longitudinal center line thereof at a point removed from the spring pivot.

4. A vehicle having a frame comprising longitudinal and transverse members, an axle adjacent one end of the frame, said axle being attached to the frame in the longitudinal center line of the frame and at a distance from the axle, a semi-elliptic spring engaging by its ends with the axle near its ends, a pair of opposed guide plates secured to the axle at its center, and a device mounted between the guide plates and movable in the direction perpendicular to the axle, the center of the spring being rigidly secured to the device, the ends of the spring being supported on the axle by gravity only whereby the spring and its attached device will be freely removable from the axle by a movement perpendicular to the axle.

5. An axle comprising spaced longitudinal members, opposed guideways secured to and between the members, a device engaging the guideways and freely movable in the direction perpendicular to the members, a semi-elliptic spring rigidly secured at its center to the device, and a platform between the members at each end thereof, the free ends of the spring resting between the members upon but unsecured to opposite platforms.

6. An axle comprising spaced longitudinal members, opposed guideways secured to and between the members, a device engaging the guideways and freely movable in the direction perpendicular to the members, a semi-elliptic spring rigidly secured at its center to the device, and a removable platform between the members at each end thereof, the free ends of the spring resting between the members upon but unsecured to opposite platforms.

7. An axle comprising a member formed of spaced elements, a guide secured between the elements at the center of the member, a shackle resting within the guide and movable perpendicularly to the longitudinal axis of the member, a semi-elliptic spring in the shackle, a follower engaging the spring at its center, and means for securing the spring within the shackle by contact of the follower.

8. An axle comprising a member formed of spaced elements, a guide secured between the elements at the center of the member, a shackle resting within the guide and movable perpendicularly to the longitudinal axis of the member, a semi-elliptic spring in the shackle, a follower engaging the spring at its center, and means carried by the guide for securing the spring within the shackle by contact of the follower.

9. An axle comprising a member formed of spaced elements, a guide secured between the elements at the center of the member, a shackle resting within the guide and movable perpendicularly to the longitudinal axis of the member, a semi-elliptic spring in the shackle, a follower engaging the spring at its center, and a wedge for securing the spring within the shackle by contact of the follower.

10. An axle comprising a member formed of spaced elements, a bracket at each end of the member for securing the elements together, a guide secured between the elements at the center of the member, a shackle movable in the guide in a plane perpendicular to the longitudinal axis of the member, said shackle having an opening therethrough, a semi-elliptic spring within the opening, a follower engaging the spring, said follower having inclined faces, a wedge engaging each face and means for moving the wedges to clamp the spring in the shackle by means of the follower.

11. An axle comprising a member formed of spaced elements, a bracket at each end of the member and secured to elements, a guide secured between the elements at the center of the member, a shackle resting within the guide and movable perpendicularly to the longitudinal axis of the member, a semi-elliptic spring secured at its center to the shackle, a bearing member carried by each bracket, the ends of the springs engaging said members and movable relatively thereto.

12. An axle comprising a member formed of spaced elements, a bracket at each end of the member and secured to the elements, a guide secured between the elements at the center of the member, a shackle resting within the guide and movable perpendicularly to the longitudinal axis of the member, a semi-elliptic spring secured at its center to the shackle, a removable bearing member carried by each bracket, the ends of the springs engaging said members and movable relatively thereto.

13. An axle comprising a member formed of spaced elements, a bracket at each end of the member and secured to the elements, a guide secured between the elements at the center of the member, a shackle resting within the guide and movable perpendicularly to the longitudinal axis of the member, a semi-elliptic spring secured at its center to the shackle, a bearing member carried by each bracket, the ends of the springs engaging said members and movable relatively thereto, the spring bearing surfaces of the members being convex.

14. An axle comprising a member formed of spaced elements, a bracket at each end of the member and secured to the elements, a guide secured between the elements at the center of the member, a shackle resting within the guide and movable perpendicularly to the longitudinal axis of the member, a semi-elliptic spring secured at its center to the shackle, a removable bearing member carried by each bracket, the ends of the springs engaging said members and movable relatively thereto, the spring bearing surfaces of the members being convex.

This specification signed and witnessed this 21st day of November, 1918.

JOHN M. LANSDEN.

Witnesses:
A. E. RENTON,
ABRAHAM FASTORE.